US011157608B2

(12) United States Patent
Araki (10) Patent No.: US 11,157,608 B2
(45) Date of Patent: Oct. 26, 2021

(54) INFORMATION PROCESSING SYSTEM ALLOWING A TARGET DEVICE TO PROCESS AN OPERATION REQUEST USING A COMMON API

(71) Applicant: Ricoh Company, Ltd., Tokyo (JP)

(72) Inventor: Ryoji Araki, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 294 days.

(21) Appl. No.: 16/351,583

(22) Filed: Mar. 13, 2019

(65) Prior Publication Data

US 2019/0286809 A1 Sep. 19, 2019

(30) Foreign Application Priority Data

Mar. 15, 2018 (JP) .............................. JP2018-048628

(51) Int. Cl.
*H04L 29/06* (2006.01)
*G06F 21/44* (2013.01)
(Continued)

(52) U.S. Cl.
CPC .............. *G06F 21/44* (2013.01); *G06F 21/30* (2013.01); *G06F 21/316* (2013.01);
(Continued)

(58) Field of Classification Search
CPC ........ G06F 21/44; G06F 21/30; G06F 21/316; G06F 2221/2141; H04L 63/0807;
(Continued)

(56) References Cited

U.S. PATENT DOCUMENTS

2006/0215201 A1 9/2006 Shimizu et al.
2007/0008583 A1 1/2007 Araki
(Continued)

FOREIGN PATENT DOCUMENTS

CN 101411146 A 4/2009
CN 103227807 A 7/2013
(Continued)

OTHER PUBLICATIONS

Extended European Search Report dated Jul. 24, 2019 in Patent Application No. 19159167.6, 6 pages.

*Primary Examiner* — Jeffrey C Pwu
*Assistant Examiner* — William A Corum, Jr.
(74) *Attorney, Agent, or Firm* — Xsensus LLP (57) ABSTRACT

An information processing system, apparatus, and method. The information processing system includes a plurality of types of devices connected to the information processing apparatus via a network, acquires usage authorization information indicating authority to use any one of the plurality of types of devices in response to an operation request not dependent on a type of the device based on user identification information of a user requesting an operation, specifies user account information with respect to the device related to the operation request based on the acquired usage authorization information, and cause the device to process the requested operation through an interface corresponding to the device based on the specified account information.

7 Claims, 10 Drawing Sheets

(51) Int. Cl.
*G06F 21/31* (2013.01)
*G06F 21/30* (2013.01)

(52) U.S. Cl.
CPC ........ *H04L 63/083* (2013.01); *H04L 63/0807* (2013.01); *H04L 63/10* (2013.01); *G06F 2221/2141* (2013.01)

(58) Field of Classification Search
CPC ... H04L 63/083; H04L 63/10; H04L 63/0876; H04L 63/108
See application file for complete search history.

(56) References Cited

U.S. PATENT DOCUMENTS

| | | | |
|---|---|---|---|
| 2007/0283295 A1* | 12/2007 | Honma | H04N 1/00973 |
| | | | 715/847 |
| 2008/0209569 A1 | 8/2008 | Araki | |
| 2008/0256459 A1* | 10/2008 | Sekiya | G06F 21/34 |
| | | | 715/741 |
| 2011/0041144 A1 | 2/2011 | Araki | |
| 2011/0106882 A1* | 5/2011 | Takakura | H04L 67/10 |
| | | | 709/203 |
| 2011/0225600 A1 | 9/2011 | Araki | |
| 2011/0231864 A1* | 9/2011 | Raj B.K | G06F 9/541 |
| | | | 719/321 |
| 2012/0212779 A1 | 8/2012 | Araki | |
| 2012/0216062 A1 | 8/2012 | Araki | |
| 2012/0297397 A1 | 11/2012 | Araki | |
| 2012/0311613 A1* | 12/2012 | Mikkelsen | H04L 47/24 |
| | | | 719/328 |
| 2013/0254903 A1 | 9/2013 | Araki | |
| 2014/0123239 A1 | 5/2014 | Fukuda et al. | |
| 2014/0123240 A1 | 5/2014 | Seo et al. | |
| 2014/0229931 A1 | 8/2014 | Araki | |
| 2015/0074667 A1 | 3/2015 | Araki | |
| 2015/0120857 A1 | 4/2015 | Nagai | |
| 2015/0128231 A1* | 5/2015 | Nakajima | G06F 21/45 |
| | | | 726/5 |
| 2015/0154573 A1 | 6/2015 | Araki | |
| 2015/0264039 A1 | 9/2015 | Fukuda | |
| 2015/0264211 A1 | 9/2015 | Araki | |
| 2016/0065756 A1 | 3/2016 | Araki et al. | |
| 2016/0203033 A1 | 7/2016 | Araki | |
| 2016/0205277 A1 | 7/2016 | Araki | |
| 2016/0275282 A1 | 9/2016 | Araki | |
| 2016/0306951 A1* | 10/2016 | Hiratsuka | G06F 21/10 |
| 2017/0161048 A1 | 6/2017 | Araki | |
| 2017/0293457 A1 | 10/2017 | Araki | |
| 2018/0048773 A1 | 2/2018 | Araki | |
| 2018/0270392 A1 | 9/2018 | Araki | |

FOREIGN PATENT DOCUMENTS

| | | |
|---|---|---|
| JP | 2015-172824 | 10/2015 |
| JP | 2016-042327 | 3/2016 |
| JP | 2016-218825 | 12/2016 |
| WO | 2016/164633 A1 | 10/2016 |

* cited by examiner

| USER ID | USER NAME | E-MAIL ADDRESS | CLOUD SERVICE ACCOUNT | ROLE GROUP |
|---|---|---|---|---|
| aaa | aaa aaa | aaa@aaa.com | aaa@xxx.com | user |
| bbb | bbb bbb | bbb@bbb.com | bbb@xxx.com | : |
| : | : | : | : | : |

| ROLE GROUP | MFP ROLE | ELECTRONIC WHITEBOARD ROLE | ... |
|---|---|---|---|
| – | Guest | iwbuser | ... |
| user | Authenticated User | iwbuser | ... |
| admin | Machine Administrator | iwbadmin | ... |
| CE | Customer Engineer | iwbadmin | ... |
| : | : | : | : |

| USER ID | USER NAME | E-MAIL ADDRESS | CLOUD SERVICE ACCOUNT | ROLE SET |
|---|---|---|---|---|
| aaa | aaa aaa | aaa@aaa.com | aaa@xxx.com | mfp:MachineAdministrator, iwb: iwbadmin, : |
| bbb | bbb bbb | bbb@bbb.com | bbb@xxx.com | mfp:Guest, iwb: iwbuser, : |
| : | : | : | : | : |

| DEVICE TYPE | ROLE | ACCOUNT INFORMATION |
|---|---|---|
| mfp | Guest | \<UID\>,\<PWD\> |
| | Authenticated User | \<UID\>,\<PWD\> |
| | Machine Administrator | \<UID\>,\<PWD\> |
| | Customer Engineer | \<UID\>,\<PWD\> |
| | : | : |
| iwb | iwbuser | iwbuser |
| | iwbadmin | iwbadmin |
| | : | : |

INFORMATION PROCESSING SYSTEM ALLOWING A TARGET DEVICE TO PROCESS AN OPERATION REQUEST USING A COMMON API

CROSS-REFERENCE TO RELATED APPLICATIONS

This patent application is based on and claims priority pursuant to 35 U.S.C. § 119(a) to Japanese Patent Application No. 2018-048628, filed on Mar. 15, 2018, in the Japan Patent Office, the entire disclosure of which is hereby incorporated by reference herein.

BACKGROUND

Technical Field

The present disclosure relates to an information processing system, an information processing apparatus, and an information processing method.

Background Art

In offices and the like, a variety of devices including image forming devices such as printers, copiers, or multifunction peripherals (MFPs), devices supporting communication such as an electronic whiteboard, a video conference system, a projector, a digital signage, etc. may be used.

Each device has a unique interface called an application programming interface (API), in order to enable construction of a solution suitable for a user. A developer of software for providing the solution can develop software by using the API of each device.

SUMMARY

Embodiments of the present disclosure described herein provide an information processing system, apparatus, and method. The information processing system includes a plurality of types of devices connected to the information processing apparatus via a network, acquires usage authorization information indicating authority to use any one of the plurality of types of devices in response to an operation request not dependent on the type of device based on user identification information of a user requesting an operation, specifies user account information with respect to the device related to the operation request based on the acquired usage authorization information, and causes the device to process the requested operation through an interface corresponding to the device based on the specified account information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the plural forms as well, unless the context clearly indicates otherwise.

Figure 1:
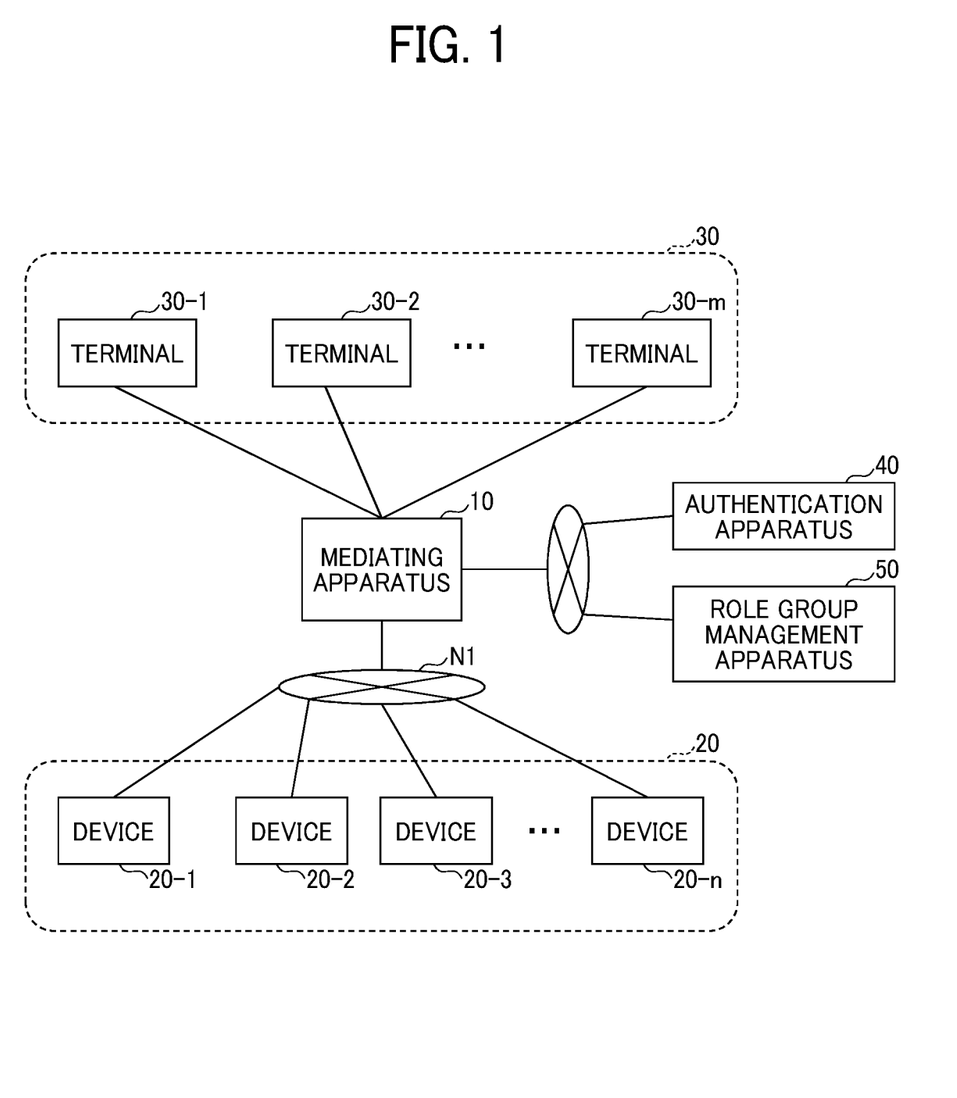
FIG. 1 is a block diagram illustrating a system configuration according to a first embodiment of the present disclosure.

Hereinafter, a description is given of embodiments of the present disclosure with reference to the drawings. FIG. 1 is a diagram illustrating a system configuration according to a first embodiment of the present disclosure. FIG. 1 illustrates an example of a system environment (hereinafter referred to as an "in-house system") within a certain company.

In FIG. 1, the in-house system includes a plurality of devices such as devices 20-1 to 20-*n* (hereinafter referred to as a "device 20" unless the devices are distinguished from each other) and one or more terminals 30-1 to 30-*m* (hereinafter, referred to as a "terminal 30" unless they are distinguished from each other), a mediating apparatus 10, an authentication apparatus 40, and a role group management apparatus 50.

The plurality of devices 20 such as the devices 20-1 to 20-*n* includes two or more types of devices 20 such as a printer, a copier, an MFP, an electronic whiteboard, a video conference system, a projector, a digital signage, a projector, and is connected to a network N1 in the company. Two or more devices 20 of the same type may be included, or the types of all the devices 20 (hereinafter referred to as a "device type") may be different.

Each device 20 has a unique application programming interface (hereinafter referred to as a "unique API") for each device type, and the device 20 can be operated by calling the relevant unique API via the network. For example, the API of each device 20 may be a web API based on Hypertext Transfer Protocol (HTTP).

On the other hand, one or more terminals 30 such as the terminals 30-1 to 30-m are, for example, a smartphone, a tablet terminal, a personal computer (PC), or the like. Alternatively, an operation panel of any of the devices 20 may be usable as the terminal 30. In each terminal 30, an application program (hereinafter simply referred to as an "application") for operating the device 20 is installed. Each application may be implemented, for example, as a web application operating on a web browser. Note that a typical smartphone is a terminal having multiple functions such as a call function as a mobile phone, an imaging function as a camera, and a web information display function such as a PC and a typical tablet terminal functions as a multifunction terminal like a smartphone.

The mediating apparatus 10 absorbs differences of the unique APIs of each type of the device and provides a common interface, that is, an interface independent of the device type (hereinafter referred to as a "common API") to the plurality of types of devices 20 to each terminal 30 (each application). By providing the mediating apparatus 10, for example, the developer of the application can develop applications by learning the common API. The mediating apparatus 10 can communicate with each terminal 30, the authentication apparatus 40, and the role group management apparatus 50. Further, the mediating apparatus 10 can communicate with each device 20 via the network N1.

The authentication apparatus 40 is a computer that authenticates a user who operates any of the devices 20 among the users of the terminal 30. Note that any of the devices 20 may be used as the authentication apparatus 40.

The role group management apparatus 50 is a computer that manages information on usage authorization for each device 20 with respect to a user authenticated by the authentication apparatus 40. However, any of the devices 20 may be used as the role group management apparatus 50.

Note that the authentication apparatus 40 and the role group management apparatus 50 may be connected to the network N1 or may be capable of communicating with the mediating apparatus 10 via, for example, the internet or the like. Further, the authentication apparatus 40 and the role group management apparatus 50 need not be separate devices. For example, the authentication apparatus 40 and the role group management apparatus 50 may be implemented together in one or more computers.

Figure 2:
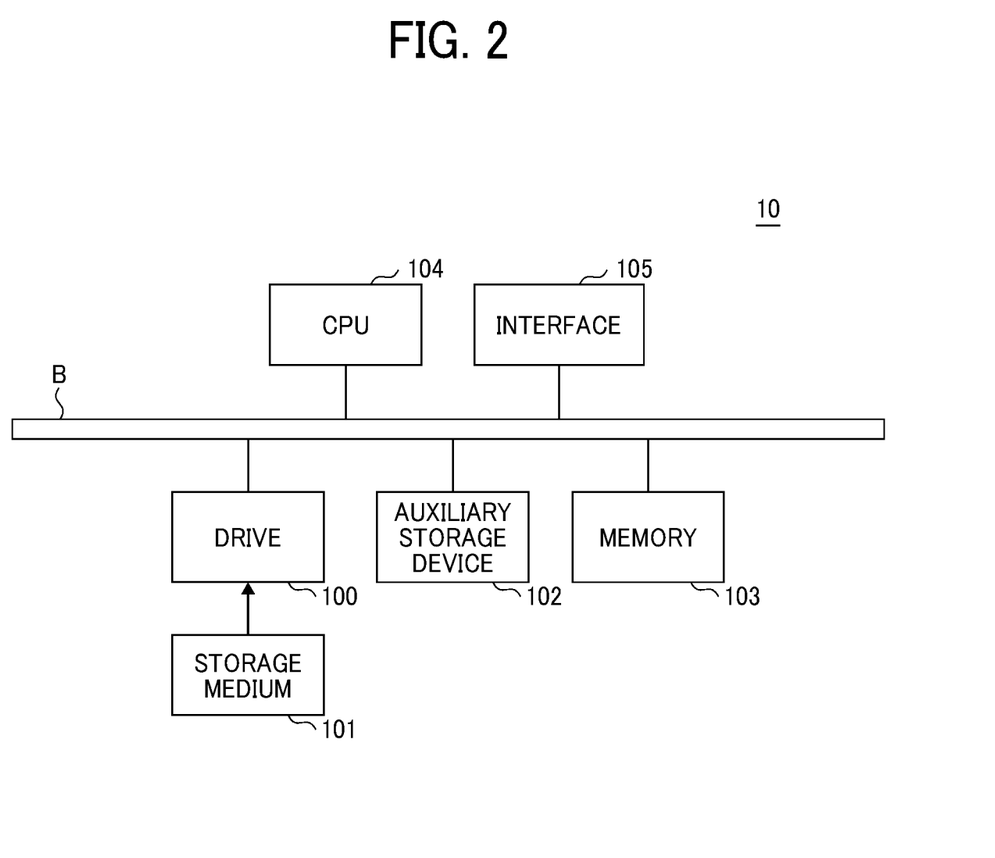
FIG. 2 is a block diagram illustrating a hardware configuration of a mediating apparatus 10 according to the first embodiment.

FIG. 2 is a block diagram illustrating a hardware configuration of the mediating apparatus 10 according to the first embodiment. The mediating apparatus 10 as illustrated in FIG. 2 includes a drive 100, an auxiliary storage device 102, a memory 103, a central processing unit (CPU) 104, an interface 105, and the like, which are interconnected via a bus B.

A storage medium 101 such as a compact disc-read only memory (CD-ROM) stores a program which implements processing in the mediating apparatus 10. When the storage medium 101 storing the program is set in the drive 100, the program is installed in the auxiliary storage device 102 via the drive 100 from the storage medium 101. Alternatively, the program may be downloaded from another computer via the network rather than installed from the storage medium 101. The auxiliary storage device 102 stores the installed program and any necessary files, data, and the like.

The memory 103 reads and stores the program from the auxiliary storage device 102 in response to an instruction to activate the program. The CPU 104 executes the function of the mediating apparatus 10 according to the program stored in the memory 103. The interface 105 is used as an interface for connecting to the network.

Figure 3:
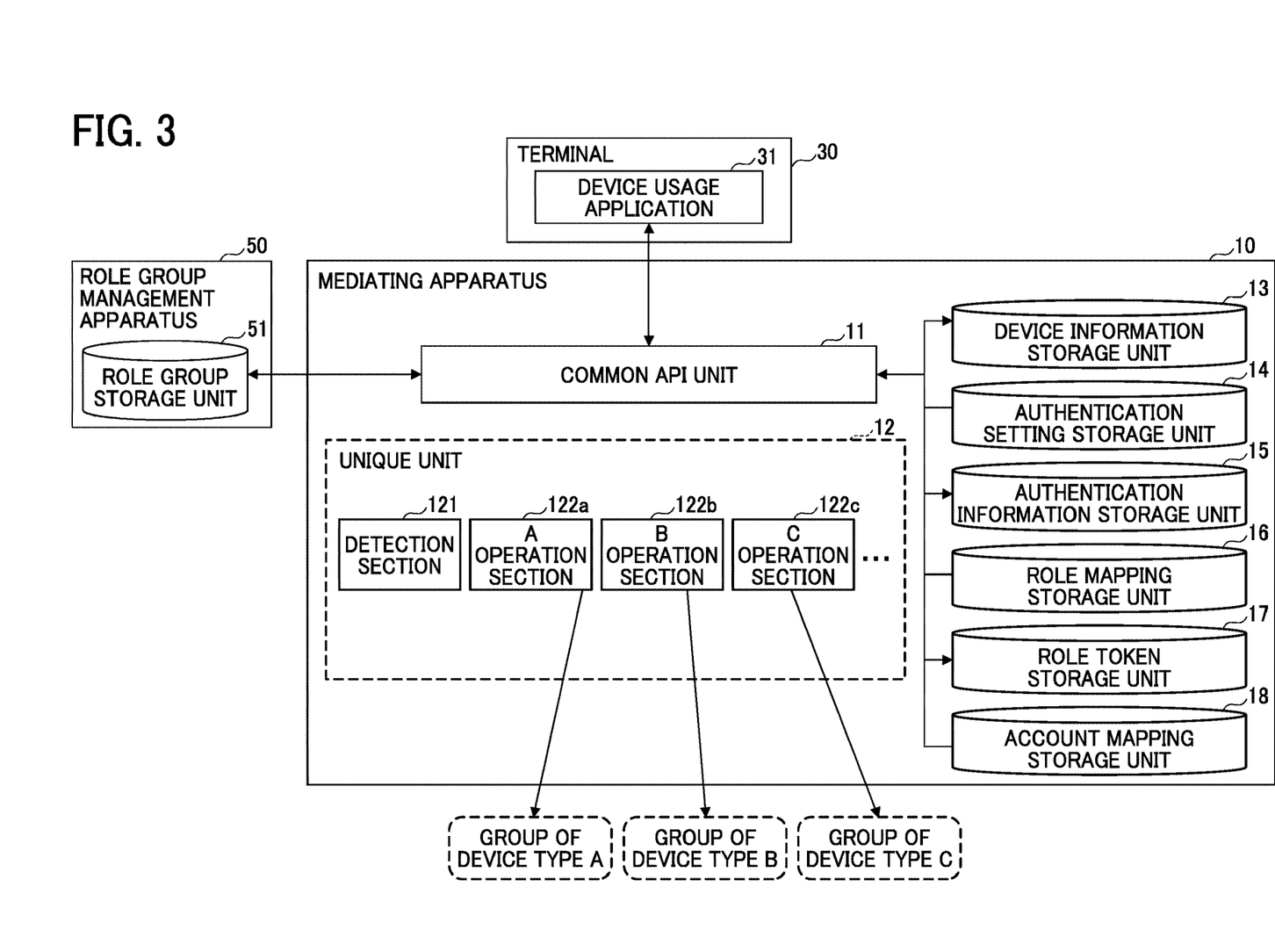
FIG. 3 is a diagram illustrating a functional configuration of the mediating apparatus according to the first embodiment.

FIG. 3 is a diagram illustrating a functional configuration of the mediating apparatus 10 according to the first embodiment. In FIG. 3, the mediating apparatus 10 includes a common API unit 11 and a unique unit 12. These components are implemented by a process that one or more programs installed in the mediating apparatus 10 cause the CPU 104 to execute. The mediating apparatus 10 also uses a device information storage unit 13, an authentication setting storage unit 14, an authentication information storage unit 15, a role mapping storage unit 16, a role token storage unit 17, an account mapping storage unit 18, and the like. Each of these storage units can be implemented by using, for example, the auxiliary storage device 102 or a storage device or the like connectable to the mediating apparatus 10 via the network.

The common API unit 11, for example, provides the common API to a device usage application 31, which is an example of the application installed in the terminal 30. The common API includes methods or functions related to a management system of the device 20 (hereinafter referred to as "methods"), methods related to an operation system of the device 20, and the like. For example, a method corresponding to an acquisition request of a list of the devices 20 connected to the network N1 is a method related to the management system. The methods related to the operation system of the device 20 include methods corresponding to a job execution request (operation request of the device 20).

However, capabilities, or functions, of the devices 20 differ depending on the device type. For example, the image forming apparatus has functions such as scanning and printing, whereas the electronic whiteboard has no such functions. Therefore, if the method of the operation system is concrete on the function level of each device 20, such as a "scan request" or a "print request", each method is effective only for a specific type of device 20 and there is a possibility that the common API corresponds one-to-one with the unique API.

Therefore, in the present embodiment, the functions of the respective devices 20 are shared at an abstracted level, and methods of the common API are defined with the shared granularity (units). For example, an "input request" and an "output request" correspond to such a method. In the case of the image forming apparatus, the input request corresponds to the scan request, and in the case of the projector, the electronic whiteboard, the digital signage or the like, the input request corresponds to a read request of data to be processed. Further, the output request corresponds to the print request in the case of the image forming apparatus, and corresponds to a projection request, a display request, or the like of data to be processed, in the case of the projector, the electronic whiteboard, the digital signage or the like.

The unique unit 12 converts the launched common API into the unique API and operates each device 20 using the unique API. In FIG. 3, the unique unit 12 includes a detection section 121, an A operation section 122a, a B operation section 122b, a C operation section 122c, and the like. The detection section 121 corresponds to the method of the management system and detects the device 20 connected to the network N1 and acquires device information (for example, management information base (MIB)) of the detected device 20. The acquired device information is stored in the device information storage unit 13. Since many of the devices 20 are compliant with simple network management protocol (SNMP), any differences between interfaces of the devices 20 are small with regard to acquisition of the device information. However, depending on the device type, configuration of a private MIB may be different. The detection section 121 stores the device information in which the difference in the configuration of the MIB is absorbed in the device information storage unit 13.

The A operation section 122a operates a group of devices 20 of a device type A (for example, MFP) via the unique API of the device type A. The B operation section 122b operates a group of devices 20 of a device type B (for example, electronic whiteboard) via the unique API of the device type B. The C operation section 122c operates a group of devices 20 of a device type C (for example, projector) via the unique API of the device type C.

In other words, a function of operating the device 20 via the unique API of the device 20 is common to the A operation section 122a, the B operation section 122b, and the C operation section 122c (hereinafter, referred to as "operation section 122" when the operation sections are not distinguished), however, the applicable device type is different. An operation section 122 corresponding to another type of device 20 may be provided. In order to facilitate expansion and contraction of the unique unit 12, the detection section 121 and the operation section 122 may be configured as a plug-in for the common API unit 11.

In the authentication setting storage unit 14, information indicating whether or not a user is required to be authenticated (hereinafter referred to as an "authentication setting") is stored. The authentication setting may be common to all the terminals 30 or may be settable for each terminal 30.

The authentication information storage unit 15 stores authentication information of an authenticated user in association with an internet protocol (IP) address of the user's terminal 30 and a device identification (ID) of an operation target device 20. The authentication information stored in the authentication information storage unit 15 may be authentication information (user ID, password, etc.) input by the user, or may be processed data such as an encrypted value, a hash value, or the like.

In the role mapping storage unit 16, roles for each device type are stored for each role group. Role refers to identification information of the level or range of usage authorization of the device 20. A role group is identification information for a set of roles for each device type. In the role group storage unit 51 of the role group management apparatus 50, the role group of the user is stored in association with the user ID of each user.

In the role token storage unit 17, a role token, which is data including the role for each device type, is stored in association with the user ID of the user operating any device 20 via the mediating apparatus 10.

The account mapping storage unit 18 stores account information for each role valid for each device type. The account information is identification information of the user, which is required to be presented to the device 20 when using the device 20.

Figure 4:
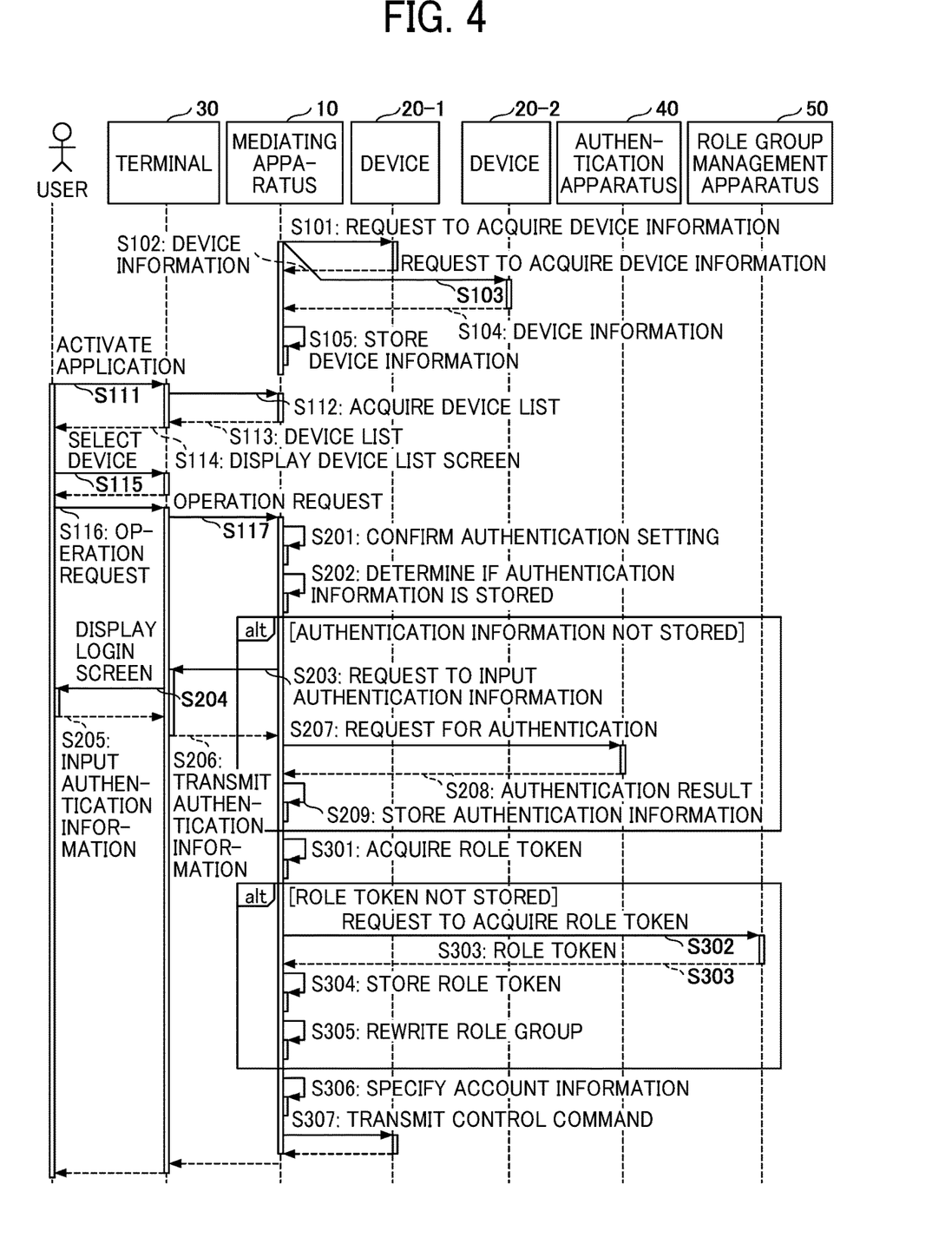
FIG. 4 is a sequence diagram for describing a process executed by the mediating apparatus according to the first embodiment.

A description is given below of a process performed by the mediating apparatus 10. FIG. 4 is a sequence diagram for describing a process executed by the mediating apparatus 10 according to the first embodiment.

In steps S101 and S103, the detection section 121 transmits a device information acquisition request to each device 20 connected to the network N1, for example, at the time of activation of the mediating apparatus 10 or at fixed time intervals, and in steps S102 and S104, receives the device information from each device 20. In FIG. 4, an example in which device information is acquired from two devices 20 is illustrated, but the device information is acquired from each device 20 connected to the network N1.

The device information acquisition request may be transmitted, for example, by broadcasting to a predetermined network address. For the device 20 having an IP address outside the predetermined network address range, the IP address may be registered in advance and the device information acquisition request may be transmitted by unicast for the IP address. SNMP may be used to acquire the device information and MIB information may be acquired as the device information. At this time, when object identifiers (OIDs) differ according to the device type, the detection section 121 designates an OID corresponding to the device type and acquires the device information corresponding to the OID. A link between the device type and the OID may be incorporated as logic of the detection section 121 or may be stored in the auxiliary storage device 102 or the like, for example. For example, information including items (parameters) such as media access control (MAC) address, IP address, host name, device name, device type, state, etc., is acquired as the device information. The detection section 121 stores the acquired device information in the device information storage unit 13.

In step S111, when terminal 30 activates the device usage application 31 in response to an operation by the user, the device usage application 31 calls the device list acquisition method of the common API unit 11 of the mediating apparatus 10 to transmit a request to acquire the device list to the common API unit 11 in step S112.

In step S113, the common API unit 11 outputs a list of the device information (device list) stored in the device information storage unit 13 to the device usage application 31 as a response to the method. The device list is an example of a list in which the device 20 related to each device information can be selected. Note that the list of device information may be acquired from each device 20 in response to the calling of the method. In step S114, the device usage application 31 displays a device list screen based on the device list in response to receiving the device list.

Figure 5:
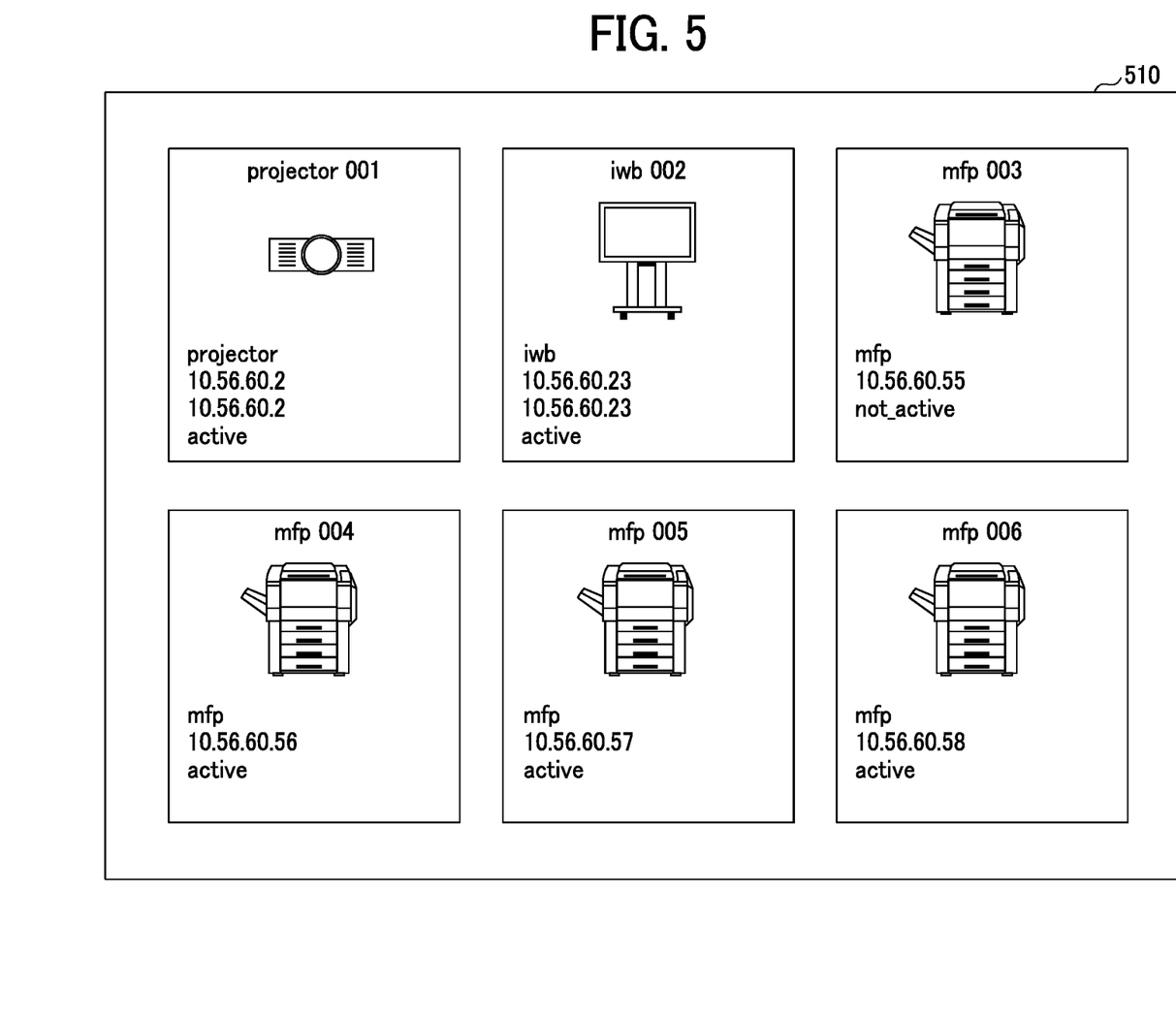
FIG. 5 is a diagram illustrating an example of a device list screen.

FIG. 5 is a diagram illustrating an example of the device list screen. In FIG. 5, each device information included in the device list is displayed in a tile format on the device list screen 510. In each tile, an icon corresponding to the device type, a part of items included in the device information, and the like are displayed. Therefore, the user can confirm the information of various types of devices 20 on one device list screen 510. The format of the device list screen 510 illustrated in FIG. 5 is an example, and alternatively, for example, the device list may be displayed in a table format.

In step S115, when any tile on the device list screen 510 is selected by the user, the tile changes to a selected state. In this state, for example, when display of detailed information is instructed from a context menu or a pull-down menu, details of the device information of the device 20 corresponding to the selected tile may be displayed.

Figure 6:
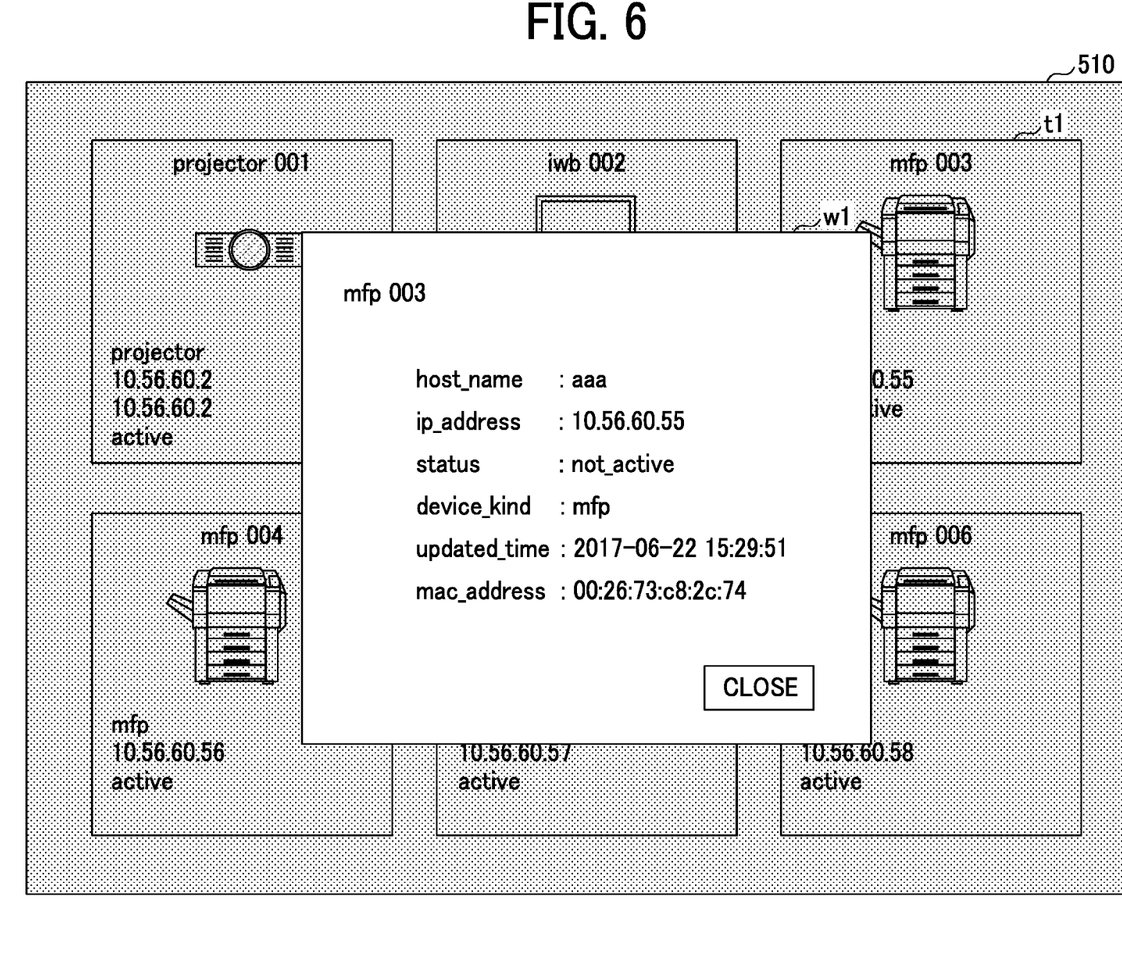
FIG. 6 is a diagram illustrating a display example of details of device information.

FIG. 6 is a diagram illustrating a display example of details of the device information. FIG. 6 illustrates an example in which details of the device information of the device 20 corresponding to a tile t1 are displayed in a pop-up window w1. Note that the details of the device information are, for example, the device information including items not displayed in the tile.

For example, when an operation of the device 20 is instructed by the user via a context menu or a pull-down menu in a state in which one of the tiles is selected in step S116, the device usage application 31 transmits the operation request to the common API unit 11 by calling a method of an operation request corresponding to the operation from the methods of the common API unit 11 of the mediating apparatus 10, in step S117. The operation request includes the device ID of the device 20 (that is, the operation target device 20) included in the device information corresponding to the selected tile. For example, the MAC address, the IP address, or the like may be used as the device ID.

The operation selectable by the user is an operation abstracted to a plurality of types of devices 20 such as "input", "output", or the like, and for example, equal to a method unit of the common API unit 11.

In step S201, the common API unit 11 confirms the authentication setting stored in the authentication setting storage unit 14 in response to the receipt of the operation request. When the authentication setting is stored for each terminal 30, the common API unit 11 confirms the authentication setting corresponding to the IP address (hereinafter referred to as "transmission source address") of the transmission source (requester) of the operation request. When the authentication setting indicates that authentication is unnecessary, steps S202 to S306 are skipped and step S307 is executed. In this case, account information described below may not be designated in step S307.

When the authentication setting indicates that authentication is required, the common API unit 11 determines whether the authentication information associated with the device ID (hereinafter referred to as "target device ID") and the transmission source address included in the received operation request is stored in the authentication information storage unit 15, in step S202.

When the corresponding authentication information is not stored in the authentication information storage unit 15, steps S301 onward are executed after steps S203 to S209 are executed.

On the other hand, when the corresponding authentication information is stored in the authentication information storage unit 15 in step S202, the common API unit 11 does not request the input of the authentication information, which means that steps S203 to S209 are not executed and step S301 onward is executed. Therefore, single sign-on is realized for various operation requests to the same device 20 from the same terminal 30.

Note that an expiration date of a certain period may be set to the authentication information stored in the authentication information storage unit 15. When the expiration date is reached, steps S203 to S209 may be executed.

In step S203, the common API unit 11 returns a response indicating an authentication information input request to the device usage application 31. Here, when the device usage application 31 is the web application and HTTP is used, the response may be "401 (Unauthorized)".

In step S204, the device usage application 31 displays a login screen according to the response. When the user inputs authentication information (user ID and password) to the login screen in step S205, the device usage application 31 transmits the authentication information to the common API unit 11 in step S206.

In step S207, the common API unit 11 controls the authentication process by transmitting an authentication request including the authentication information to the authentication apparatus 40 set in advance as an authentication request destination. In step S208, the authentication apparatus 40 verifies the authentication information against the list of correct authentication information (user ID and password), authenticates the authentication information, and returns the authentication result.

When the authentication result indicates authentication failure, the subsequent processing is aborted. Alternatively, step S203 may be repeated and the login screen may be displayed again.

When the authentication result is successful, the common API unit 11 associates the authentication information that succeeded in the authentication (that is, the authentication information received in step S206) with the transmission source address and the target device ID and stores in the authentication information storage unit 15 in step S209.

Note that only the source address may be stored in association with the authentication information in step S209. In this case, the presence or absence of authentication information associated with the transmission source address may be determined in step S202. As a result, single sign-on with respect to operation requests to a plurality of devices 20 can be realized. In other words, when the authentication is successful at the time of an operation request to any one of the devices 20, it is possible to prevent the authentication from being requested in response to the operation request to another device 20 thereafter.

In step S301, the common API unit 11 acquires a role token including a user ID (hereinafter referred to as "target user ID") stored in the authentication information storage unit 15 in association with the transmission source address and the target device ID from the role token storage unit 17. The role token is a token (data) including a role of a user for each device type.

When the role token including the target user ID is not stored in the role token storage unit 17, steps S302 to S305 are executed and the role token is acquired from the role group management apparatus 50. When logging in with the target user ID for the first time, the role token including the target user ID is not stored in the role token storage unit 17. When the role token is stored in the role token storage unit 17, steps S302 to S305 are not executed. An expiration date may be provided for the role token. In this case, even when the role token including the target user ID is stored in the role token storage unit 17, when the expiration date of the role token is reached, steps S302 to S305 are executed and the role token may be acquired.

In step S302, the common API unit 11 transmits a role token acquisition request to the role group management apparatus 50. The role token acquisition request includes the target user ID. In step S303, when the role token corresponding to the target user ID is stored in the role group storage unit 51, the role group management apparatus 50 returns the role token to the common API unit 11.

Figure 7:
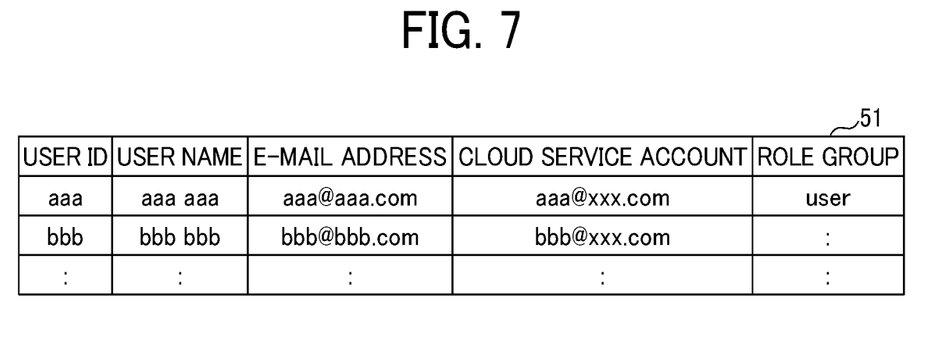
FIG. 7 is a diagram illustrating a configuration example of a role group storage unit.

FIG. 7 is a diagram illustrating a configuration example of the role group storage unit 51. As illustrated in FIG. 7, in the role group storage unit 51, a user name, an e-mail address, a cloud service account, a role group, and the like are stored for each user ID. The user name is a name of the user. The cloud service account is account information for a cloud service used by the user. In the example of FIG. 7, a role group of a user whose user ID is "aaa" (hereinafter referred to as a "user aaa", and other users also conform to such naming rule) is "user" and the role group is not set for a "user bbb". Note that each record in FIG. 7 is the role token of each user.

In step S304, upon receiving the role token, the common API unit 11 stores the role token in the role token storage unit 17. In this state, the record in the role token storage unit 17 related to the user ID (that is, the target user ID) is the same as the record in the role group storage unit 51.

In step S305, the common API unit 11 rewrites the value of the "role group" of the role token stored in the role token storage unit 17 into a specific group of roles for each device type stored in step S304. At this time, the role mapping storage unit 16 is referenced.

Figure 8:
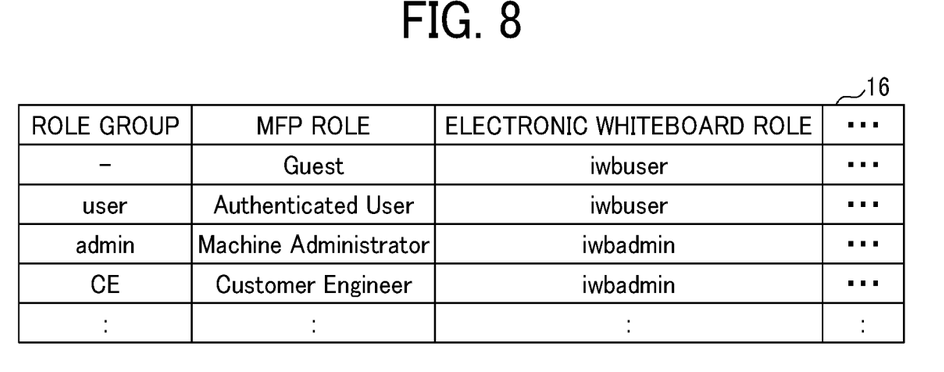
FIG. 8 is a diagram illustrating a configuration example of a role mapping storage unit.

FIG. 8 is a diagram illustrating a configuration example of the role mapping storage unit 16. The role mapping storage unit 16 stores the role of each role group for each device type such as "MFP role", "electronic whiteboard role", etc. as illustrated in FIG. 8. Here, the role for each device type refers to a role given to the user of the role group out of the roles defined in the device 20 related to each device type. For example, referring to the column of "MFP role", roles such as "Guest", "Authenticated User", "Machine Administrator", "Customer Engineer" are defined in the device 20 with the device type MFP, and for a user whose role group is "user", "Authenticated User" is assigned. Further, referring to the row of "electronic whiteboard role", roles "iwbuser" and "iwbadmin" are defined in the device 20 with the device type electronic whiteboard, (which means only whether a user is an administrator or not is defined) and for a user whose role group is "user", "iwbuser" is assigned.

Note that the role group for first record is not set and "-" is indicated. Therefore, according to the example of FIG. 8, for the user bbb whose role group is not defined in the role group storage unit 51 as illustrated in FIG. 7, it is determined that the MFP role is "Guest" and the electronic whiteboard role is "iwbuser".

Based on the relationship between the role group and usage authorization for each device 20 as illustrated for example in FIG. 8, the value of "role group" of the target token is rewritten in step S304.

Figure 9:
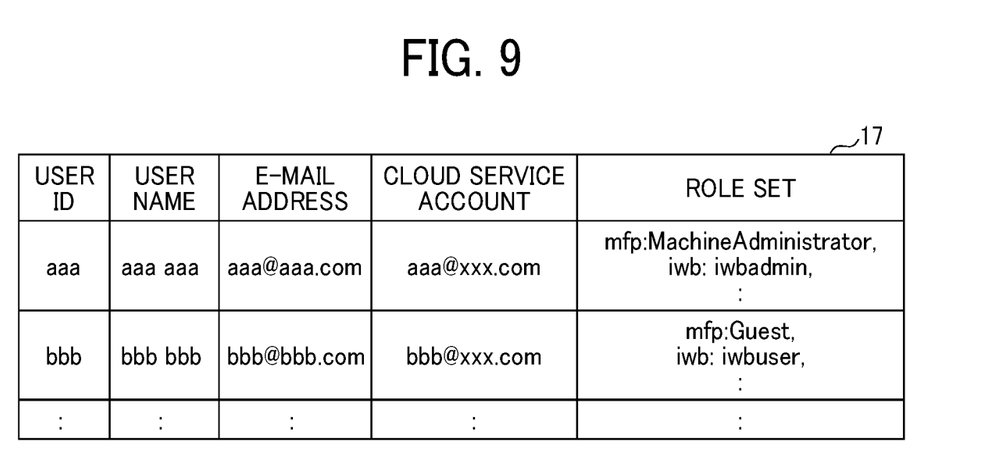
FIG. 9 is a diagram illustrating a configuration example of a role token storage unit.

FIG. 9 is a diagram illustrating a configuration example of the role token storage unit 17. In FIG. 9, the configuration of each role token stored in the role token storage unit 17 is the same as the role token illustrated in FIG. 7 except for the item "role set". In FIG. 9, a value of "role set" is defined to a specific role corresponding to each type of the device 20.

For example, for the user aaa, the value of "role set" is defined as "mfp: Machine Administrator" and "iwb: iwbadmin". Also, for the user bbb, the "role set" value is defined as "mfp: Guest, iwb: iwbuser". Note that "mfp" or "iwb" and the like given with ":" between each role is a label indicating the device type. In the present embodiment, "mfp" denotes the MFP, and "iwb" denotes the electronic whiteboard.

Following step S301 or S305, the common API unit 11 applies the role token acquired in step S301 or the role token (hereinafter referred to as "target token") whose role group has been rewritten into the role set at step S305 to the information stored in the account mapping storage unit 18 and identifies the account information of the target user ID with respect to the target device ID in step S306.

Figure 10:
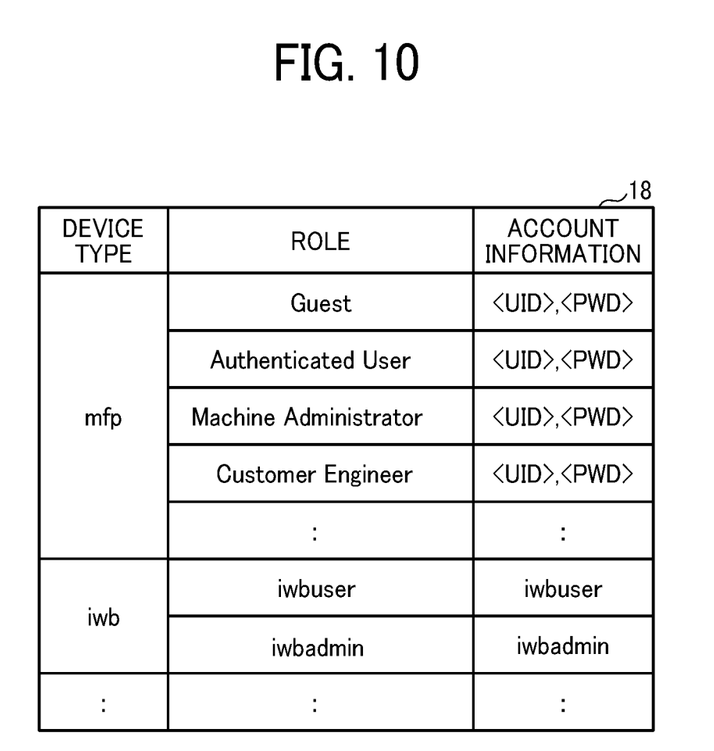
FIG. 10 is a diagram illustrating a configuration example of an account mapping storage unit.

FIG. 10 is a diagram illustrating a configuration example of the account mapping storage unit 18. As illustrated in FIG. 10, the account mapping storage unit 18 stores account information in association with the device type and role.

The account information is authentication information required to be presented to the device 20 when using the device 20 of the specified device type and role. In FIG. 10, "<UID>" indicates the target user ID. "<PWD>" indicates a password corresponding to the target user ID. On the other hand, a value (eg, "iwbuser" or "iwbadmin") not enclosed by "<" and ">" indicates that the value is adopted as it is.

In step S306, the common API unit 11 acquires from the account mapping storage unit 18, the account information related to the device type (hereinafter referred to as "target device type") of the device 20 related to the target device ID and the role related to the device type mentioned in the target token. When "<UID>" is included in the account information, the common API unit 11 replaces "<UID>" with the target user ID. Further, when "<PWD>" is included in the account information, the common API unit 11 replaces "<PWD>" with the password stored in the authentication information storage unit 15 in association with the target user ID.

The target device type can be specified by referring to the device information corresponding to the device ID among the device information stored in the device information storage unit 13.

The common API unit 11 inputs the operation request and the account information to the operation section 122 corresponding to the target device type. For example, when the specified device type is the device type A, the operation request including the target device ID and account information is input to the A operation section 122a.

In step S307, the A operation section 122a transmits a control command for executing an operation corresponding to the operation request to the device 20 associated with the target device ID included in the operation request. The control command is transmitted via the unique API included in the device 20. In response to the control command, the device 20 executes a process corresponding to the control command. As a result, the device usage application 31 can operate the device 20 without directly calling the unique API of the device 20.

Note that the processing of step S307 may be different depending on the operation section 122. For example, when the device 20 related to the target device ID has the unique API that requests logging in before accepting the operation request, the operation section 122 transmits a login request including account information to the device 20. When the authentication corresponding to the login request is successful, the operation section 122 transmits the control command to the device 20. On the other hand, when the device 20 has a unique API whose account information can be designated as an argument of the control command, the operation section 122 transmits the control command with the account information to the device 20.

By transmitting the account information to the device 20, the device 20 permits the use of the function of the device 20 within a range of the role (usage authorization) corresponding to the user related to the account information. Therefore, when the control command transmitted from the operation section 122 exceeds the range of the role, the device 20 refuses to execute processing according to the control command.

As described above, according to the first embodiment, the device usage application 31 can operate various devices 20 via the common API independent of the device type of the device 20. Therefore, it is possible to simplify the use of the plural types of devices 20.

The mediating apparatus 10 can perform authentication on the operation of the device 20 on behalf of the device 20. Therefore, for example, it is possible to reduce the necessity for the developer of the device usage application 31 to consider difference in the login method of each device 20.

Hereinafter, a description is given of a second embodiment of the present disclosure.

In the first embodiment, an example is given in which the device usage application 31 is an application that accepts the operation request for each device 20.

In the second embodiment, an example is described in which the device usage application 31 is an application that provides a service in which a plurality of devices 20 work together.

Figure 11:
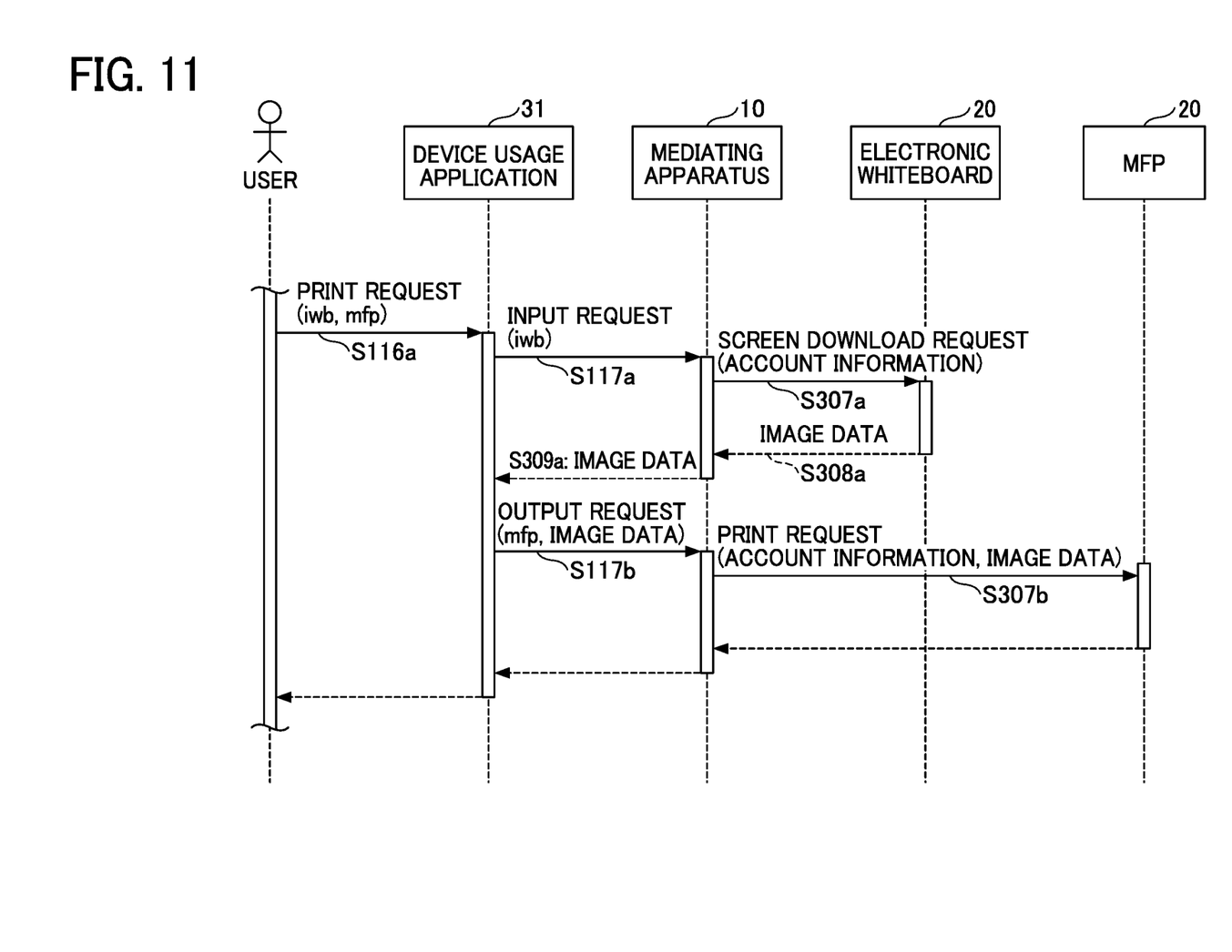
FIG. 11 is a sequence diagram for describing a first process executed by the mediating apparatus according to a second embodiment.

FIG. 11 is a sequence diagram for describing a first process executed by the mediating apparatus 10 according to the second embodiment. In FIG. 11, a step in which the alphabet ("a" or "b") is added to the step number in FIG. 4 is the step corresponding to the step in FIG. 4.

In step S116a, the device usage application 31 receives a print request designating the device ID of the device 20 which is the input source of the data to be printed (hereinafter referred to as an "input source device") and the device ID of the device 20 which is the output destination (printing destination, hereinafter referred to as an "output destination device"). Here, it is assumed that one of the electronic whiteboards is selected as the input source device (device ID "iwb") and one of the MFPs is specified as the output destination device (device ID "mfp").

In response to the print request, the device usage application 31 transmits an input request including the device ID of the input source device to the common API unit 11 in step S117a. Subsequently, steps S201 and S202 are executed, steps S203 to S209 are executed according to the execution result of step S202, and steps S302 to S305 are executed according to the execution result of step S301. Furthermore, step S306 is executed to specify the account information for the input source device, but these steps are omitted in FIG. 11 for the sake of convenience.

Subsequently, the common API unit 11 inputs the operation request (input request) and the account information to the operation section 122 corresponding to the device type of the input source device. In step S307a, the operation section 122 transmits a control command indicating a screen download request to the electronic whiteboard which is the input source device. The screen download request is a request for downloading the image data from the electronic whiteboard, which is one of the unique APIs of the electronic whiteboard. In the screen download request, "iwbuser" or "iwbadmin" is designated as the account information. The electronic whiteboard executes the requested process within the range of usage authorization corresponding to the account information. In other words, when the user associated with the account information has the usage authorization to download the image data, the electronic whiteboard returns the image data (captured data) of the drawing content on the screen to the operation section 122 in step S308a. The operation section 122 outputs the image data to the common API unit 11. The common API unit 11 includes the image data in the response to the input request in step S117a and transmits the response to the device usage application 31 in step S309a.

In step S117b, the device usage application 31 transmits an output request including the device ID of the output destination device to the common API unit 11. In addition to the device ID of the output destination device 20, data to be output is specified in the output request to the common API related to the output destination device. Here, the image data included in the response returned in step S309a is designated as an output target. Subsequently, steps S201 and S202 are executed, steps S203 to S209 are executed according to the execution result of step S202, and steps S302 to S305 are executed according to the execution result of step S301.

Furthermore, step S306 is executed to specify the account information for the output destination device, but these steps are omitted in FIG. 11 for the sake of convenience.

Subsequently, the common API unit 11 inputs the operation request (output request) and the account information to the operation section 122 corresponding to the device type of the output destination device. In step S307b, the operation section 122 transmits a control command indicating a print request to the MFP which is the output destination device. In the print request, the user ID and the password as the account information and the image data to be printed are specified. The MFP executes the requested processing within the range of usage authorization corresponding to the account information. When the user associated with the account information has the usage authorization for printing, the MFP executes the printing of the image data.

Figure 12:
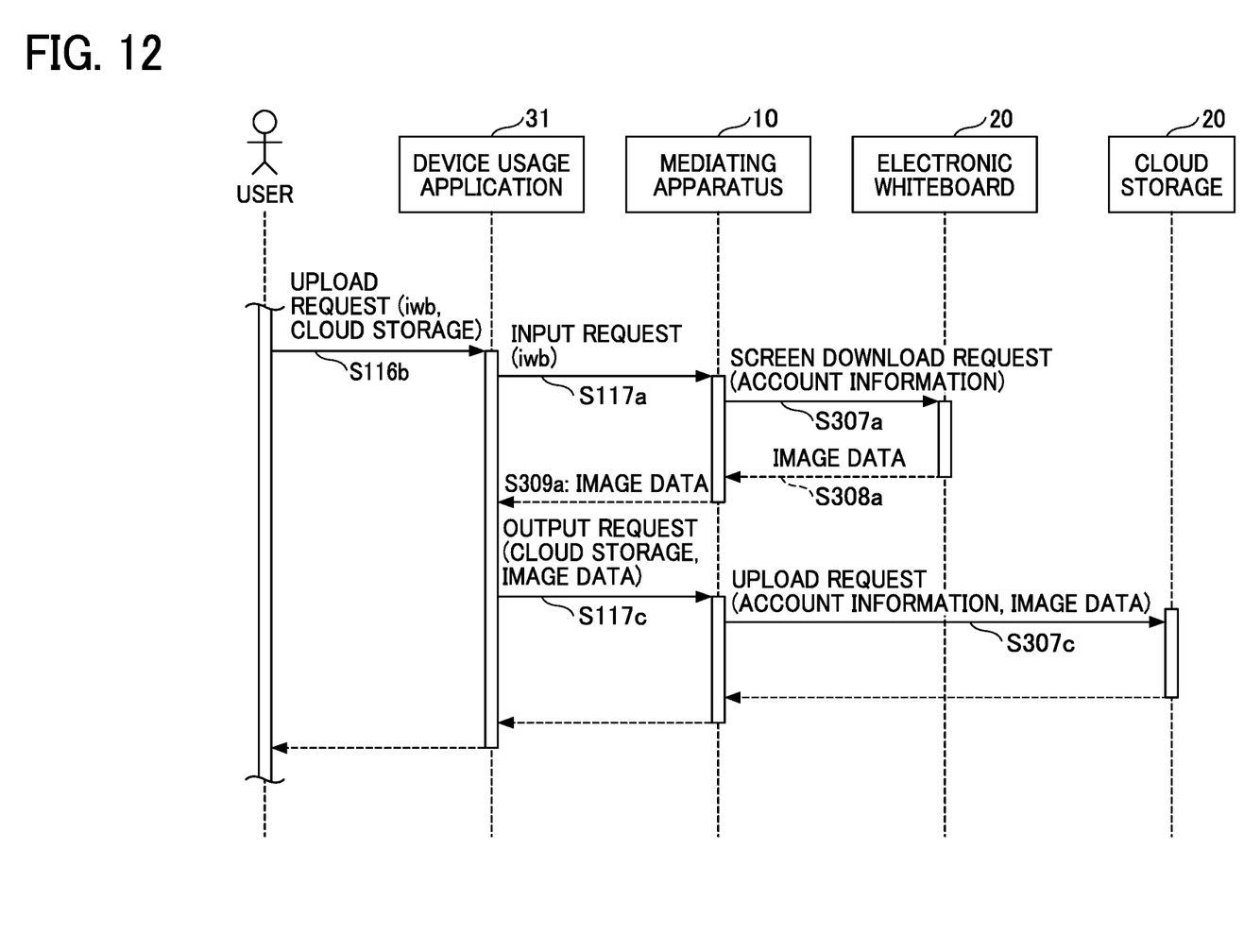
FIG. 12 is a sequence diagram for describing a second process executed by the mediating apparatus according to the second embodiment.

FIG. 12 is a sequence diagram for describing a second process executed by the mediating apparatus 10 according to the second embodiment. In FIG. 12, the same steps as those in FIG. 11 are given the same step numbers and the description thereof is omitted.

In step S116b, the device usage application 31 receives the device ID of the device 20 which inputs the data to be uploaded (hereinafter referred to as an "input source device"), and the device ID of the device 20 which is a cloud storage to upload the data (hereinafter referred to as an "output destination device") from a user. The device 20 is not limited to equipment installed in-house, and the device 20 may be a service that can be used via the internet such as the cloud storage. Here, it is assumed that one of the electronic whiteboards is selected as the input source device.

When image data (captured data of the electronic whiteboard screen) is returned from the common API unit 11 in step S309a, the device usage application 31 transmits an output request including the device ID of the output destination device to the common API unit 11 in step S117c. Subsequently, steps S201 and S202 are executed, steps S203 to S209 are executed according to the execution result of step S202, and steps S302 to S305 are executed according to the execution result of step S301. Furthermore, step S306 is executed to specify the account information for the output destination device, but these steps are omitted in FIG. 12 for the sake of convenience. As the account information of the cloud storage, "cloud service account" included in the role token related to the target user ID may be used.

Subsequently, the common API unit 11 inputs the operation request (input request) and the account information to the operation section 122 corresponding to the device type (cloud storage) of the output destination device. In step S307c, the operation section 122 transmits a control command indicating an upload request to the cloud storage which is the output destination device. In the upload request, the account information and the image data to be uploaded are specified. The cloud storage executes the requested process within the range of usage authorization corresponding to the account information. When the user associated with the account information has the usage authorization to upload data, the cloud storage stores the image data.

As described above, the device usage application 31 can provide a service that involves a plurality of devices 20 (linking a plurality of devices 20 together) via the common API without knowing the unique API of each device 20.

Note that each terminal 30 may have functional units of the mediating apparatus 10 in FIG. 3 and FIG. 8, which means that each terminal 30 may include the mediating apparatus 10.

In each of the above embodiments, the mediating apparatus 10 and the device 20 are an example of an information processing system. The mediating apparatus 10 or the terminal 30 is an example of an information processing apparatus. The common API unit 11 is an example of an acquisition unit, a specifying unit, and an authentication control unit. The role group storage unit 51 is an example of a first storage area. The role mapping storage unit 16 is an example of a second storage area. The account mapping storage unit 18 is an example of a third storage area. The authentication information storage unit 15 is an example of a fourth storage area. The terminal 30 or the device usage application 31 is an example of a request source of an operation request. The source address is an example of the first identification information. The user ID is an example of the user identification information. A role is an example of usage authorization information.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

The present disclosure can be implemented in any convenient form, for example using dedicated hardware, or a mixture of dedicated hardware and software. The present disclosure may be implemented as computer software implemented by one or more networked processing apparatuses. The network can comprise any conventional terrestrial or wireless communications network, such as the internet. The processing apparatuses can compromise any suitably programmed apparatuses such as a general-purpose computer, personal digital assistant, mobile telephone (such as a Wireless Application Protocol (WPA) or 3G-compliant phone) and so on. Since the present disclosure can be implemented as software, each and every aspect of the present disclosure thus encompasses computer software implementable on a programmable device. The computer software can be provided to the programmable device using any storage medium for storing processor readable code such as a floppy disk, hard disk, CD-ROM, magnetic tape device or solid state memory device.

The hardware platform includes any desired kind of hardware resources including, for example, a CPU, a RAM, and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

What is claimed is:

1. An information processing system, comprising:
an information processing apparatus; and
a plurality of types of devices connected to the information processing apparatus via a network, the information processing apparatus including a processor being processing circuitry configured to:
acquire usage authorization information indicating authority to use any one of the plurality of types of devices, in response to a received operation request not dependent on a type of the device, the usage authorization information being acquired based on user identification information of a user that sent the operation request requesting an operation, wherein the operation request includes device identifying information of a target device;
determine user account information based on a type of the target device related to specified in the operation request and based on the acquired usage authorization information; and
cause the target device to process the requested operation through an interface corresponding to the target device, based on the determined account information;
wherein the processing circuitry is further configured to transmit a control command via a unique API included in the target device, so that a terminal of the user can operate the target device without directly calling the unique API of the target device; and wherein the usage authorization information is role information indicating a level of usage authorization of the target device and the processing circuitry is further configured to acquire the role information based on the user identification information and the type of the target device.

2. The information processing system of claim 1, wherein the processing circuitry is further configured to:
acquire identification information of a group of users corresponding to the user requesting the operation, from a first storage area that stores the identification information of the group of users having a same usage authorization for each type of device; and
acquire the usage authorization information for the type of the target device specified in the operation request from a second storage area that stores the usage authorization information for each type of device and the identification information of the group of users having the same usage authorization.

3. The information processing system of claim 2, wherein the processing circuitry is further configured to identify the user account information for the type of the target device specified by the operation request from a third storage area that stores the account information for a combination of the type of the target device and the usage authorization information.

4. The information processing system of claim 3, wherein the processing circuitry is further configured to:
request, from the user, input of the user identification information, in response to the received operation request;
control authentication processing of the input user identification information;
store the user identification information and first identification information that identifies a request source of the operation request in a fourth storage area in association with each other, when the authentication processing of the user identification information is successful; and not request input of the user identification information to the request source, when the operation request targeting any one of the plurality of types of devices is received from a request source corresponding to the first identification information stored in association with the user identification information in the fourth storage area.

5. An information processing apparatus, comprising:
a memory that stores a plurality of instructions; and
processing circuitry that executes the plurality of instructions, configured to:
  acquire usage authorization information indicating authority to use any one of a plurality of types of devices connected to the information processing apparatus via a network, in response to a received operation request not dependent on a type of the device, the usage authorization information being acquired based on user identification information of a user that sent the operation request requesting an operation, wherein the operation request includes device identifying information of a target device;
  determine user account information based on a type of the target device specified in the operation request and based on the acquired usage authorization information; and
cause the target device to process the requested operation through an interface corresponding to the target device, based on the determined account information;
wherein the processing circuitry is further configured to transmit a control command via a unique API included in the target device, so that a terminal of the user can operate the target device without directly calling the unique API of the target device; and wherein the usage authorization information is role information indicating a level of usage authorization of the target device and the processing circuitry is further configured to acquire the role information based on the user identification information and the type of the target device.

6. An information processing method performed by a computer connectable to a plurality of types of devices via a network, comprising:
  acquiring usage authorization information indicating authority to use any one of the plurality of types of devices, in response to a received operation request not dependent on a type of the device, the usage authorization information being acquired based on user identification information of a user that sent the operation request requesting an operation, wherein the operation request includes device identifying information of a target device;
  determining user account information based on a type of the target device specified in the operation request and based on the acquired usage authorization information; and
  causing the target device to process the requested operation through an interface corresponding to the target device, based on the specified determined account information; and
  transmitting a control command via a unique API included in the target device, so that a terminal of the user can operate the target device without directly calling the unique API of the target device; and wherein the usage authorization information is role information indicating a level of usage authorization of the target device and
  acquiring the role information based on the user identification information and the type of the target device.

7. The information processing system of claim 1, wherein the control command is for executing the operation requested in the operation request to the target device.

* * * * *